(No Model.) 2 Sheets—Sheet 1.

T. BELLAIRE & J. BOUSHA.
GRAIN TALLY.

No. 361,392. Patented Apr. 19, 1887.

Witnesses
J. J. Rutley
H. F. Rutley

Inventors
Thomas Bellaire
John Bousha
per Robert Watt
Attorney (No Model.) 2 Sheets—Sheet 2.

T. BELLAIRE & J. BOUSHA.
GRAIN TALLY.

No. 361,392. Patented Apr. 19, 1887.

Witnesses!
William Cockram
Thomas J. Rutty

Inventors
Thomas Bellaire
John Bousha
per Robert Watt
Attorney.

UNITED STATES PATENT OFFICE.

THOMAS BELLAIRE AND JOHN BOUSHA, OF BELLE RIVER, ONTARIO, CANADA.

GRAIN-TALLY.

SPECIFICATION forming part of Letters Patent No. 361,392, dated April 19, 1887.

Application filed May 26, 1886. Serial No. 203,282. (No model.) Patented in Canada April 7, 1886, No. 23,773.

*To all whom it may concern:*

Be it known that we, THOMAS BELLAIRE and JOHN BOUSHA, citizens of Canada, residing at Belle River, in the county of Essex and Province of Ontario, have invented a new and useful Improvement in Grain-Tallies, (for which we have obtained a patent in Canada No. 23,773, bearing date April 7, 1886,) of which the following is a specification.

Our invention relates to improvements in grain-tallies in which in the operation of passing the grain-measure into and therefrom the machine will register the amount of grain handled in said operation; and the objects of our improvements are, first, to provide an accurate and reliable method of registering the amount of grain operated upon; second, to combine a number of indicators whereby a correct register may be kept of several distinct or different lots of grain which passed through and have been measured by the machine; and, third, to provide a convenient attachment whereby the grain after being measured may be transferred to bags. We attain these objects by the mechanism illustrated in the accompanying drawings, in which—

Figure 1:
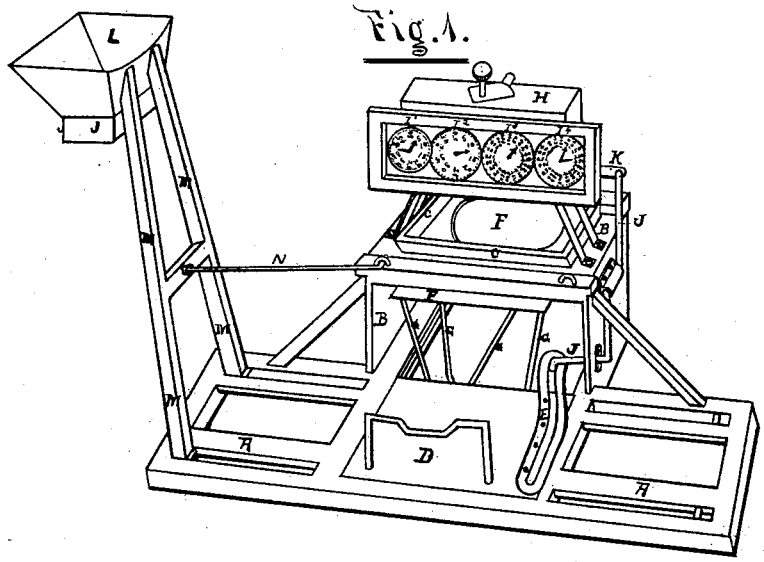
Figure 2:
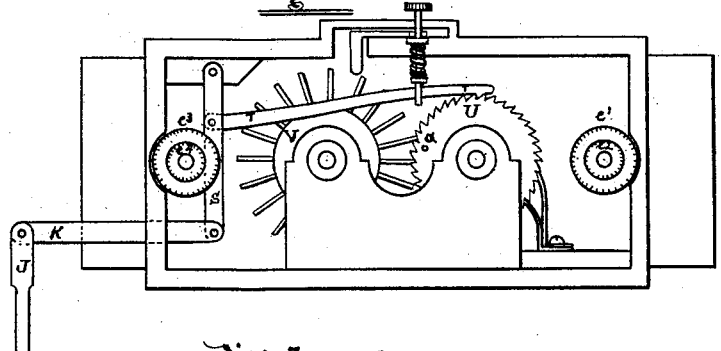
Figure 3:
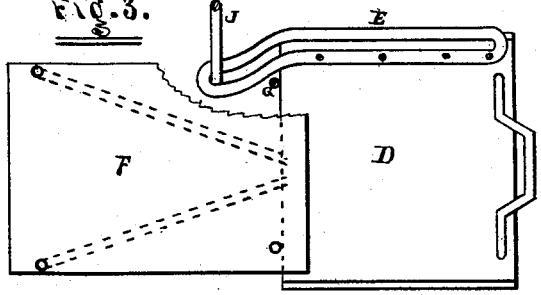
Figure 4:
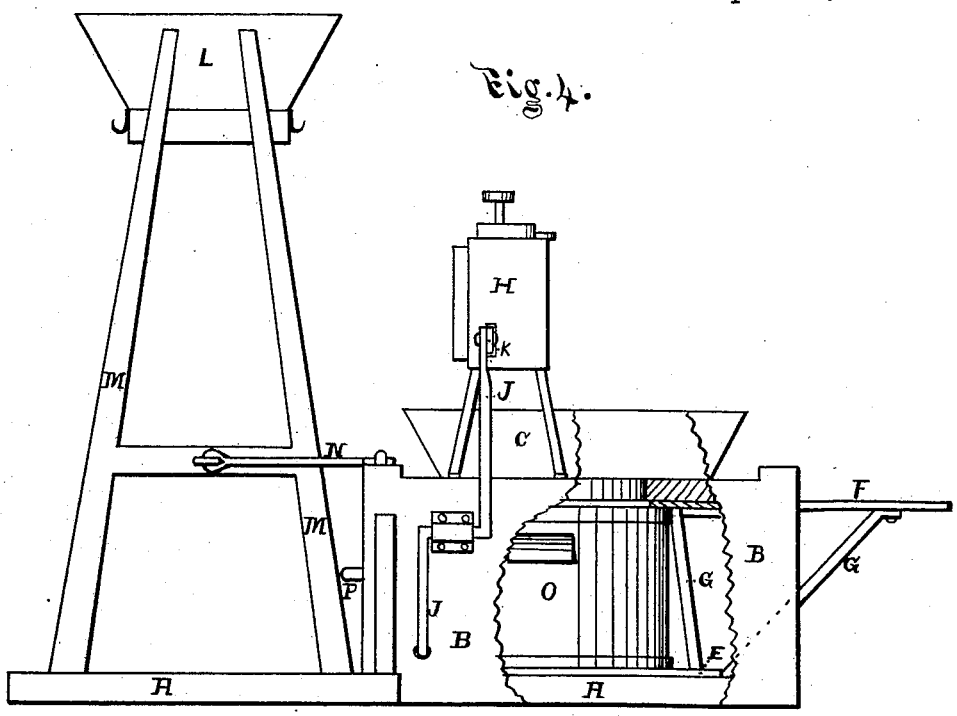
Figure 5:
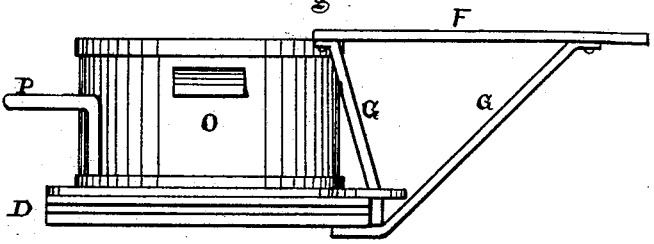

Figure 1 is a perspective view of a grain-tally embodying all the features of our invention. Fig. 2 is an elevation showing a rear view of the indicator-box with the door removed, and showing the wheels and mechanism for operating the pointers or indicators. Fig. 3 is a plan of the sliding platform which carries the grain-measure. Fig. 4 is a side elevation, looking upon the right of Fig. 1. Fig. 5 is an elevation of the sliding platform, showing the position in which the grain-measure is carried.

Similar letters refer to similar parts throughout the several views.

The frame A should be substantially constructed of wood, and is provided with two transverse portions, which extend through and project beyond the center and rear of the frame. Upon the above projections is secured a box, B, with an open front, the upper portion of said box-frame being provided with a hopper, C, for the reception of the grain to be measured. The inner edges of the transverse-extending portions of the frame A are provided with grooves, in which slide projecting tongues from the sliding platform D.

Extending beyond and above the platform D is a slide, F, which is secured to the platform by the braces and rods G. This slide F, fitting closely to the under side of the grain-hopper C, prevents the escape of grain when the platform is brought forward for the removal of the measure O, containing the grain that has passed from the hopper.

Secured to the top side of the platform D is a slotted bar, E, the rear portion of which is curved inward for the purpose of giving lateral motion to the end of a hinged lever, J, when the platform is moved into and out of the box B. The lever J is hinged on the outside of the box B, near the top edge. The lower portion of said lever being bent passes into the box B. The lower end being again bent downward, is held in the slot of the slotted bar E. The upper end of the lever J is connected to one end of the connecting-rod K.

Situated above and to the front of the box B is an indicator-box, H, which is provided with a glass front, through which can be seen the indicator-dials I' I$^2$ I$^3$ I$^4$. Passing through the end of and into the box H is the end of the connecting-rod K, which is pivoted to the end of a swinging lever, S. Near the center of the length of the swinging lever is pivoted one end of the pawl-rod T, the pawl end engaging with the teeth of a ratchet-wheel, U. Projecting from the front face of the wheel U is a pin, $a$, which operates upon the spokes of a radial spoke-wheel, V, moving the said spoke-wheel a fraction of a revolution for each revolution of the ratchet-wheel. Both wheels being mounted upon separate spindles thus operate the pointers upon the dials I$^2$ and I$^3$.

Situated on each side of the wheels U and V are hollow spindles supported upon suitable bearings, and provided with disks $e'$ $e^2$ on their inner ends, the outer ends of said hollow spindles carrying the pointers, which indicate one on each dial I' and dial I$^4$, respectively. Passing through the hollow spindles are spindles which are also provided with disks $e^3$ $e^4$, and pointers which indicate on the dials I' and I$^4$.

These pointers are operated by hand by rotating the disks at the ends of the spindles, and are used for keeping a register of the total measurements of grain which have previously been measured by the machine, the center dials, I² and I³, with their pointers, automatically registering the amount of grain measured during the operation of measuring.

At either end of the frame A is erected the standard M, to the top of which is secured the funnel L, the lower portion of said funnel being provided with hooks for supporting and holding open the mouths of bags for the reception of the grain which has been measured by the machine.

In operation, the grain to be measured is received in the hopper C. The measure O being placed upon the platform D is moved into the box B. The slide F moving back permits the grain to enter the measure O, which when full is withdrawn with the platform and slide, said slide closing the bottom of the hopper and preventing the exit of grain. This reciprocating motion of the platform having given lateral motion to the end of the lever J, owing to the end of said lever passing into the slot of the bar E, will thus, through the medium of the connecting-rod K, swinging in lever S, and pawl T, rotate the ratchet-wheel U one notch, which is indicated by the divisions on the dial I², and represents the amount of grain in the measure once full. For each revolution of the ratchet-wheel the spoke-wheel V is rotated one spoke ahead. This is indicated by the divisions on the dial I³, and represents the amount of grain measured by one revolution of the pointer on dial I².

Having thus described our invention, what we claim as new, and desire to secure by Letters Patent, is—

1. The combination, with the frame A, having a box, B, provided with a hopper, C, of the measure-carrying reciprocating platform D, having a slide, F, and curved slotted bar E, which gives lateral motion to the end of the hinged lever J, for the purpose of operating a register, substantially as and for the purposes set forth.

2. In a grain register or tally, the combination of the curved slotted bar E, secured to the platform D, hinged lever J, connecting-rod K, passing into the end of the indicator-box H, swinging lever S, pawl T, which rotates the wheel U, the spoke-wheel V, operated by the pin a, projecting from the side of the wheel U, and the automatic registering-dials I² and I³, substantially as and for the purposes set forth.

THOMAS BELLAIRE.
JOHN BOUSHA.

Witnesses:
A. J. CONLEY,
WILLIAM WESTERN.